US007391442B1

United States Patent
Fleischman et al.

(10) Patent No.: US 7,391,442 B1
(45) Date of Patent: Jun. 24, 2008

(54) DIGITAL CAMERA INCLUDING A DISTORTION CORRECTION SYSTEM

(75) Inventors: Thomas J. Fleischman, Poughkeepsie, NY (US); David C. Long, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/933,708

(22) Filed: Nov. 1, 2007

(51) Int. Cl.
  H04N 5/228 (2006.01)
  H04N 5/76 (2006.01)
  H04N 5/262 (2006.01)
  H04N 5/232 (2006.01)
  H04N 9/64 (2006.01)
  G06K 9/40 (2006.01)

(52) U.S. Cl. ............... 348/222.1; 348/231.3; 348/239; 348/348; 348/251; 382/275

(58) Field of Classification Search ............... 348/251, 348/339, 335, 231.2, 231.3, 241, 348; 382/275
  See application file for complete search history.

(56) References Cited

U.S. PATENT DOCUMENTS

| | | | |
|---|---|---|---|
| 6,449,004 B1 * | 9/2002 | Okisu et al. ............ 348/239 |
| 6,963,365 B2 | 11/2005 | Baron | |
| 7,035,462 B2 * | 4/2006 | White et al. ............ 382/167 |
| 7,129,974 B2 * | 10/2006 | Morichika ............ 348/231.99 |
| 7,260,271 B2 | 8/2007 | Funamoto | |
| 2003/0128276 A1 | 7/2003 | Boyd | |
| 2004/0041920 A1 * | 3/2004 | Mizukami et al. ......... 348/222.1 |
| 2006/0222260 A1 * | 10/2006 | Sambongi et al. ............ 382/274 |
| 2007/0065039 A1 | 3/2007 | Park | |
| 2007/0098380 A1 | 5/2007 | Spielberg | |

FOREIGN PATENT DOCUMENTS

JP 02105108 4/1990

* cited by examiner

*Primary Examiner*—Nhan T Tran
(74) *Attorney, Agent, or Firm*—Cantor Colburn LLP; Kerry Goodwin

(57) ABSTRACT

A digital camera system includes a camera body; a lens mounted to the camera body, and an image processor operatively coupled to the lens. The image processor converts a visual image passing into the lens to a digital format to form a captured digital image. The digital camera system also includes an angle sensor mounted in the camera body. The angle sensor, in the form of a multi-spot focus angle sensor, determines a camera angle position and outputs camera angle position data. A distortion processor operatively coupled to the digital camera receives the camera angle position data obtained from the sensor and the captured digital image from the image processor to selectively remove distortions associated with the camera angle position to form a corrected digital image.

3 Claims, 2 Drawing Sheets

DIGITAL CAMERA INCLUDING A DISTORTION CORRECTION SYSTEM

BACKGROUND OF THE INVENTION

1. Field of the Invention

This invention relates to the art of digital camera systems and, more particularly, to a digital camera system including an angle sensor employed in connection with an image distortion correction process.

2. Description of Background

In the art of photography, image distortions are a common occurrence. Various lens configurations, e.g., telephoto lenses, wide-angle lenses and the like, cause distortions in captured images. Conventionally, photographers either avoided using outer magnification ranges of the lenses to avoid distortion effects or expected viewers to simply accept the poor picture quality. Over time, specialty lenses were developed to address the distortion effects. The specialty lenses minimized or corrected distortions at the outer magnification ranges. Unfortunately, the specialty lenses currently available are expensive and often times difficult to use.

At present, more modern digital cameras are rapidly replacing conventional cameras. Image distortion, however, remains an issue. Digital cameras typically address image distortions through post processing techniques. More specifically, after capturing a digital image of an object, the camera is connected to a computer including a processing software package. The digital image is downloaded onto the computer and processed by the processing software to correct distortions as necessary. However, removing distortions with processing software can be very cumbersome. The software programs currently available are complicated, often times requiring much trial and error on the part of a user until a desired output is obtained.

SUMMARY OF THE INVENTION

The shortcomings of the prior art are overcome and additional advantages are provided through the provision of a digital camera system including a camera body; a lens mounted to the camera body, and an image processor operatively coupled to the lens and the display. The image processor converts a visual image passing into the lens to a digital format to form a captured digital image. The digital camera system also includes multi-spot angle sensor mounted in the camera body. The angle sensor determines a camera angle position by measuring relative lengths of a plurality of beams passing between the camera body and an object to be photographed, and outputs camera angle position data. A distortion processor operatively coupled to the digital camera receives the camera angle position data obtained from the sensor, and the captured digital image from the image processor to selectively remove distortions associated with the camera angle position to form a corrected digital image.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
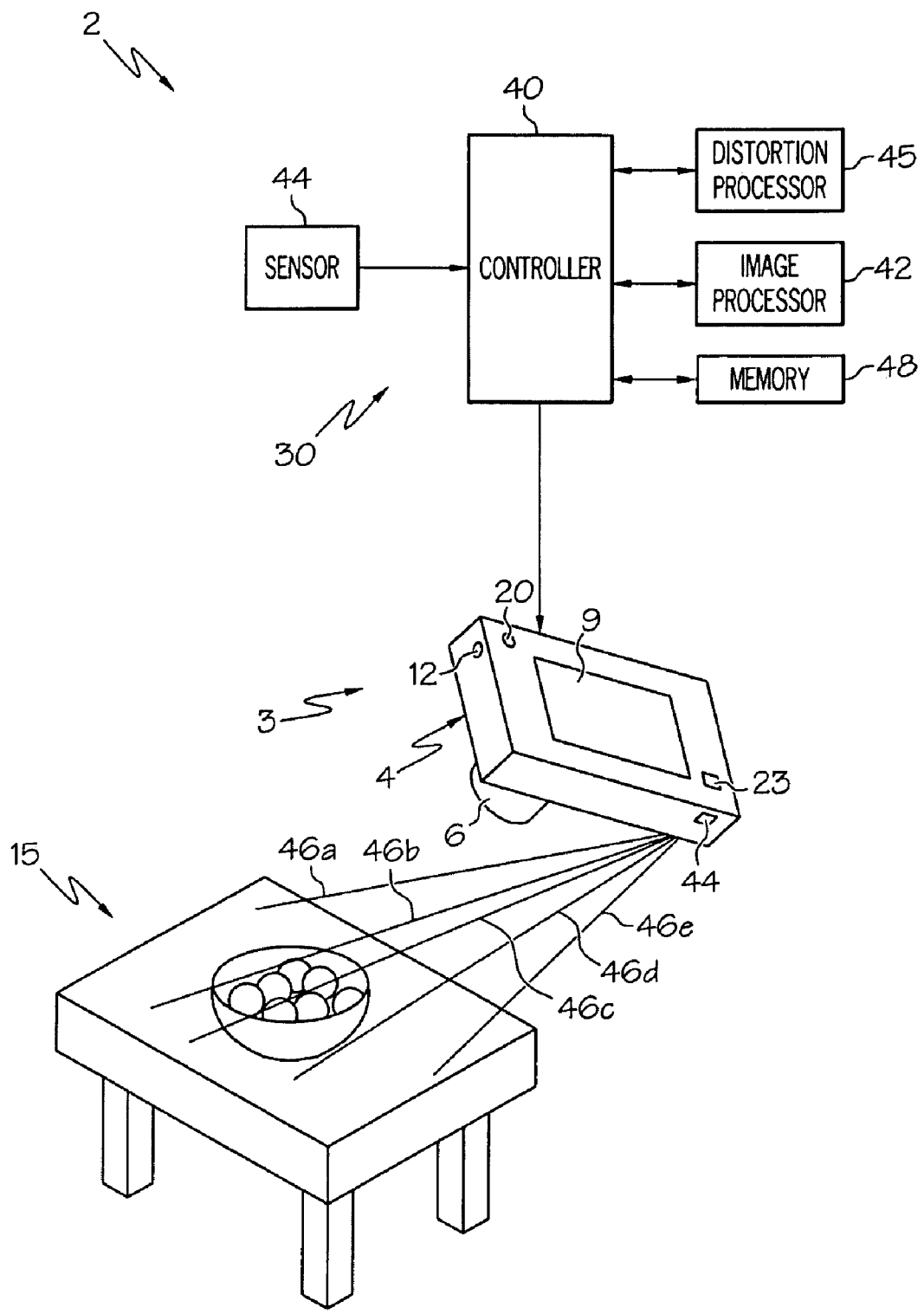
FIG. 1 illustrates one example of a digital camera system including an angle sensor constructed in accordance with an exemplary embodiment of the present invention.

Turning now to the drawings in greater detail, it will be seen that in FIG. 1 there is a digital camera system indicated generally at 2. Camera system 2 includes a digital camera 3 having a main body 4 provided with a lens member 6 and a display portion 9. In addition, camera 3 includes a capture button 12 which, as will be discussed more fully below, is activated to capture an image of an object to be photographed, such as indicated generally at 15. Camera 3 also includes a features button 20 that enables a user to change various settings for capturing pictures, storing pictures, processing pictures, and the like and an input/output or I/O port 23 that provides an interface for external devices, such as personal computers and portable media storage devices.

In accordance with the exemplary embodiment shown, camera system 2 includes in image capture system 30 that captures and formats digital images of the object being photographed. More specifically, images passing through lens member 6 are passed to a controller or central processing unit (CPU) 40 and onto to an image processor 42 which coverts the captured image to a digital format. In addition, camera 3 is provided with a tilt or angle sensor 44 that obtains camera angle data representative of an angle of camera 3 relative to the object being photographed. Angle sensor 44 can be formed from a variety of various position-type sensors such as a mercury-like sensor, a pendulum sensor or a micro electro-mechanical system or MEMS sensor to detect an up/down tilt of camera 3. In addition, sensor 44 can be a multi-spot focus arrangement that sends out multiple beams, usually infrared, such as indicated at 46a-46e. Measuring a length of each beam 46a-46e, sensor 44 calculates relative distances to the object to be photographed and determines an angle of camera 3. Camera system 2 is also operatively coupled to a distortion processor 45 that employs the camera angle data obtained from angle sensor 44 to correct image distortions in the captured image. Camera system 2 is also shown to be coupled to a memory 48 which stores captured and/or corrected digital images of the object being photographed.

At this point, it should be understood that while illustrated as a CPU, controller 40 could include any appropriate high-powered solid-state switching device. It should also be appreciated by those skilled in the art, that controller 40 can be a separate dedicated or programmable integrated or other electronic device such as a personal computer or the like. In general, any device or similar devices capable of implementing the flow charts as illustrated in the application can be used as controller 40.

Figure 2:
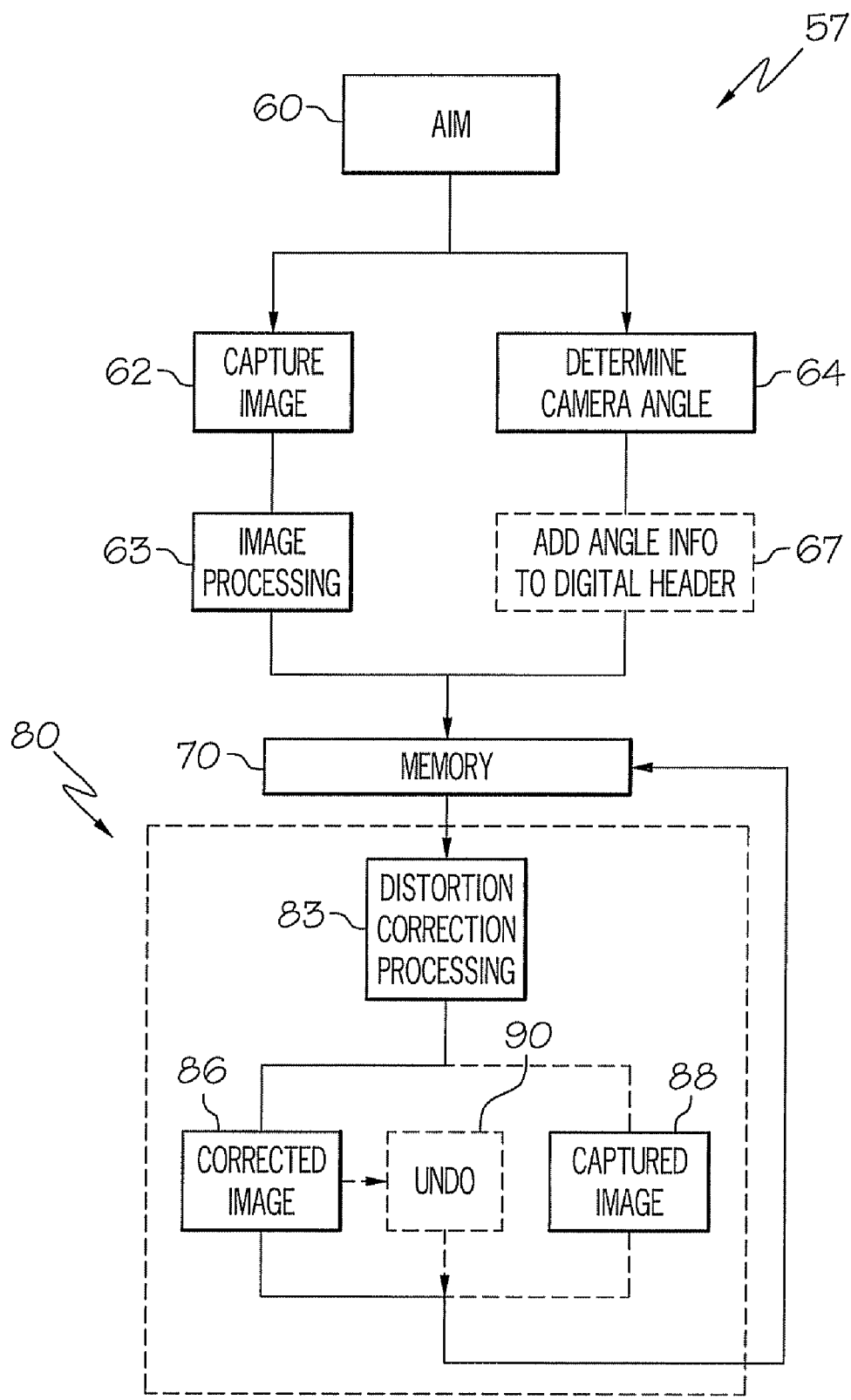
FIG. 2 is a flow diagram illustrating an image capture and distortion correction process of the exemplary embodiment.

At this point, reference will be made to FIG. 2 in describing an image capture and distortion correction process 57 in accordance with an exemplary embodiment of the invention. In order to capture an image of an object to be photographed, lens member 6 is aimed toward, or directed at the object, as indicated in block 60. At this point, capture button 12 is activated to capture an image of the object to be photographed, as indicated in block 62. Once captured, the image is passed to image processor 19 in as indicated in block 63. Simultaneously with capturing the image of the object, image capture and distortion correction process 57 collects angle data representative of the angle of camera 3 relative to the object as indicated in block 64. In accordance with one aspect of the exemplary embodiment, the angle data obtained through sensor 34 is embedded as a digital header of the captured image in block 67. At this point, the captured image and camera angle data are passed to a memory 48 carried within digital camera 3 as indicated in block 70. Alternatively, the captured image and angle data can be passed to an external memory.

In accordance with aspect of the invention, the captured image and angle data are passed to a distortion correction portion 80. Distortion correction portion 80 can be carried internally in camera 3 or, alternatively, be part of an external photo processing software system. In any event, the captured image and angle data are passed to distortion processor 45 in block 83. Distortion processor 45 utilizes the angle data collected in block 64 to correct the image captured in block 62. In one example, distortion processor 45 will digitally stretch a portion of the captured image to adjust for, or correct, any distortions resulting from the angle of camera 3. In any event, after processing, a corrected image is created in block 86. The corrected image is then passed back to memory 48 for further processing by the user. That is, at this point the user can elect to save the corrected image, print a digital photograph, or send to a company for processing. In addition, distortion processor 45 can also output a captured image as indicated in block 88. The captured image includes the angle data in a digital header. In this manner, the user is provided with the option of viewing the image as actually captured or saving the captured image for later processing. In addition, by storing angle data in the digital header, after the corrected image is formed, distortion processor 64 can be employed to undo or remove corrections to the captured image such as indicated in block 90. That is, if the user desires to return from the corrected image to the captured image, camera 3 includes an "undo" option.

In any event, it should be appreciated that the present invention provides for a relatively simple and cost-effective arrangement for correcting camera angle distortions in a digital camera system without requiring a great deal of trial and error by a user. That is, the system corrects for camera angle distortions without requiring multiple manipulations or extensive training on the part of the user. In any case, it should also be appreciated that the flow diagrams depicted herein are just examples. There may be many variations to these diagrams or the steps (or operations) described therein without departing from the spirit of the invention. For instance, the steps may be performed in a differing order, or steps may be added, deleted or modified. The steps could be performed wholly within the camera or a portion of the steps could be preformed outside the camera using externals photo processing software. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A digital camera system comprising:
   a camera body;
   a lens mounted to the camera body;
   an image processor operatively coupled to the lens, the image processor converting a visual image passing into the lens to a digital format to form a captured digital image;
   a multi-spot focus angle sensor mounted in the camera body, the sensor determining a camera angle position by measuring relative lengths of a plurality of beams passing between the camera body and an object to be photographed and outputting camera angle position data;
   a distortion processor operatively coupled to the digital camera, the distortion processor receiving the camera angle position data obtained from the angle sensor and the captured digital image from the image processor, the distortion processor selectively removing distortions associated with the camera angle position to form a corrected digital image; and
   a single memory operatively connected to the distortion processor and the image processor, the single memory permanently storing the captured digital image and the corrected digital image, wherein the camera angle position data is stored as a picture file header associated with the captured digital image, the distortion processor selectively employing the camera angle position data in the picture file header to form the corrected digital image and to remove corrections from a corrected digital image.

2. The digital camera system according to claim 1, wherein the distortion processor is mounted in the camera body.

3. The digital camera system according to claim 1, wherein the distortion processor is mounted remote from the camera body.

* * * * *